Figure 1:
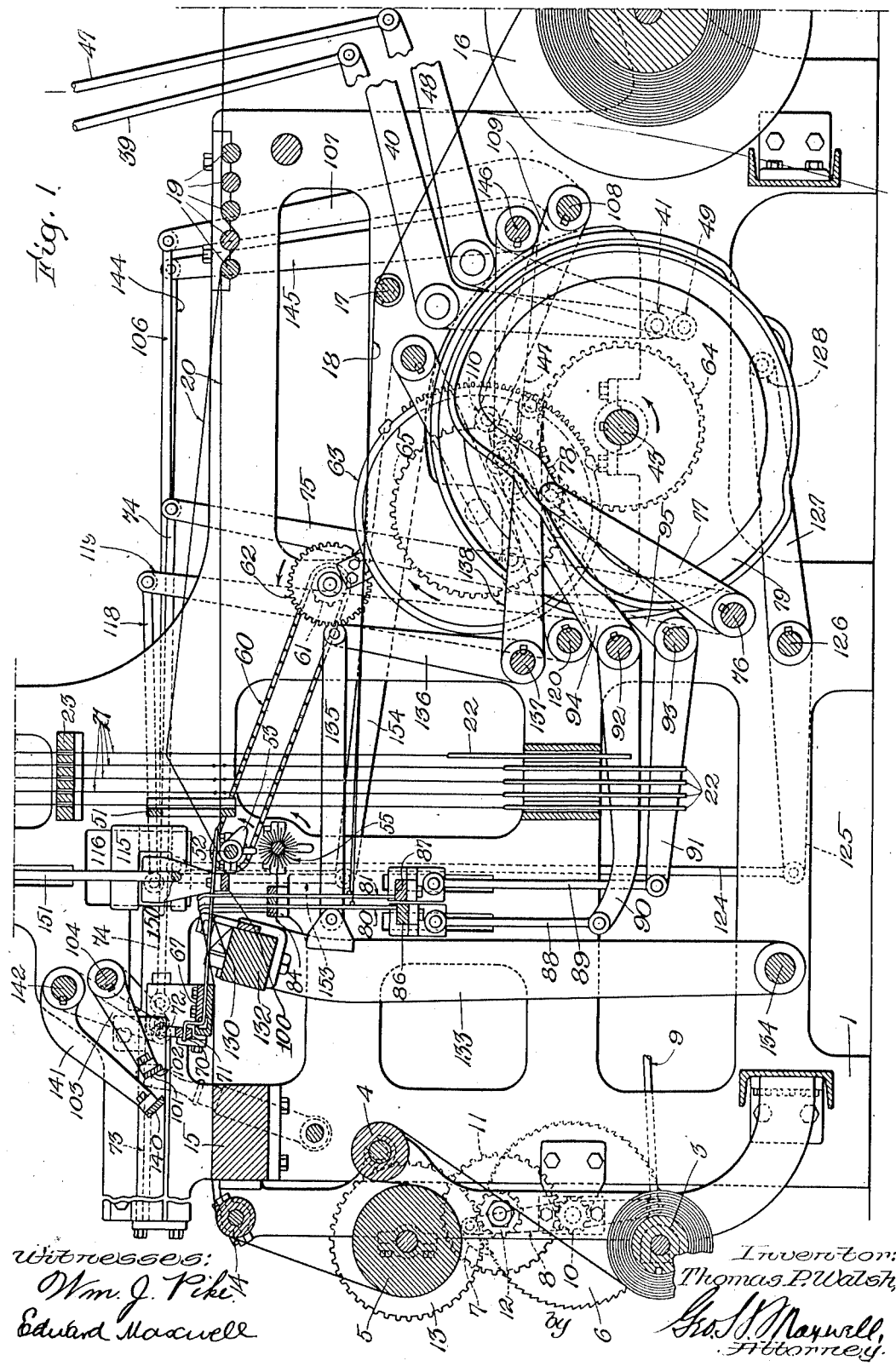

T. P. WALSH.
LOOM FOR WEAVING ORIENTAL KNOTTED FABRICS.
APPLICATION FILED AUG. 22, 1910.

1,071,973.

Patented Sept. 2, 1913.

10 SHEETS—SHEET 1.

T. P. WALSH.
LOOM FOR WEAVING ORIENTAL KNOTTED FABRICS.
APPLICATION FILED AUG. 22, 1910.

1,071,973.

Patented Sept. 2, 1913.

10 SHEETS—SHEET 4.

Witnesses:
Wm. J. Pike
Edward Maxwell

Inventor:
Thomas P. Walsh,
by Geo. W. Maxwell,
Attorney.

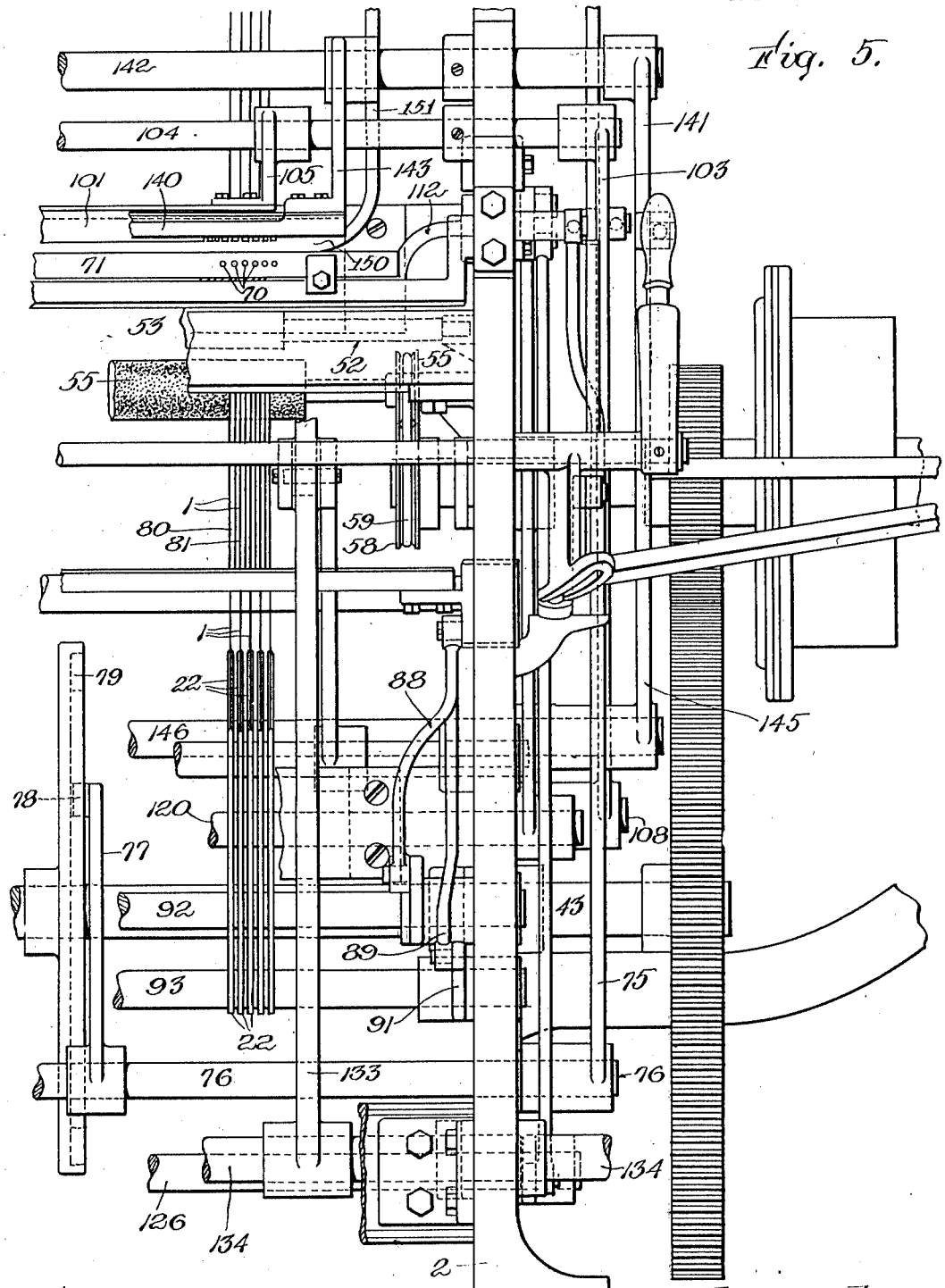

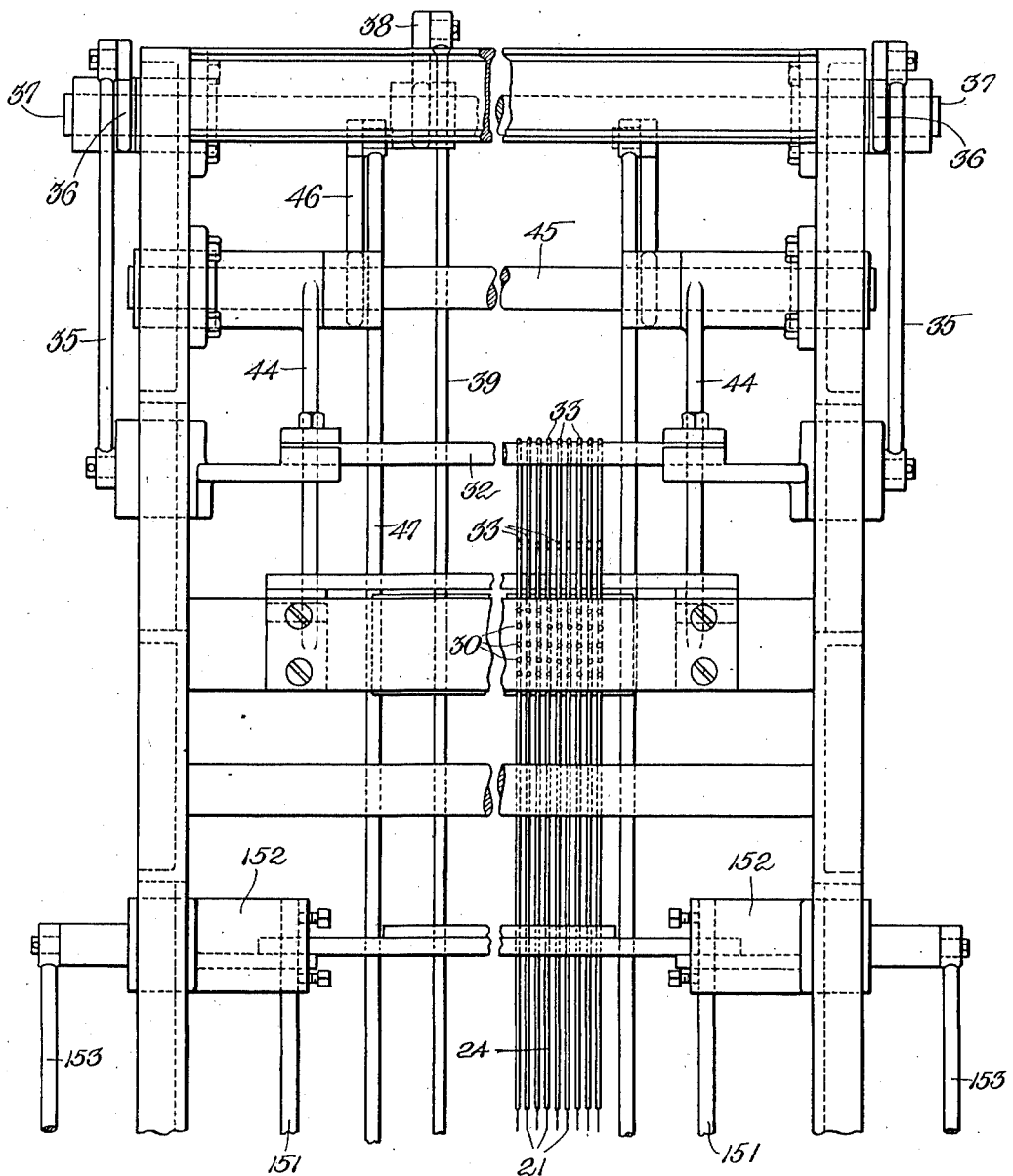

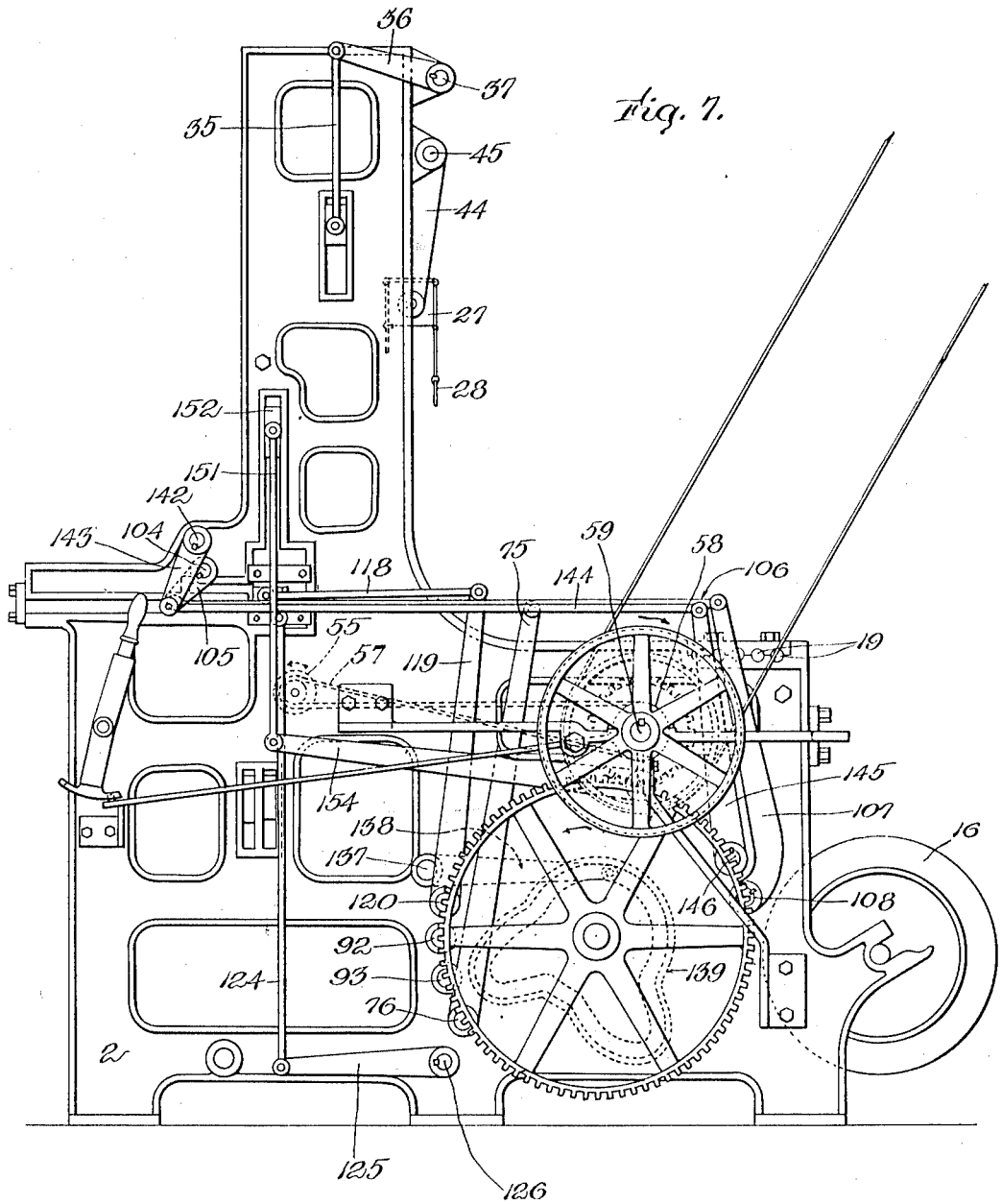

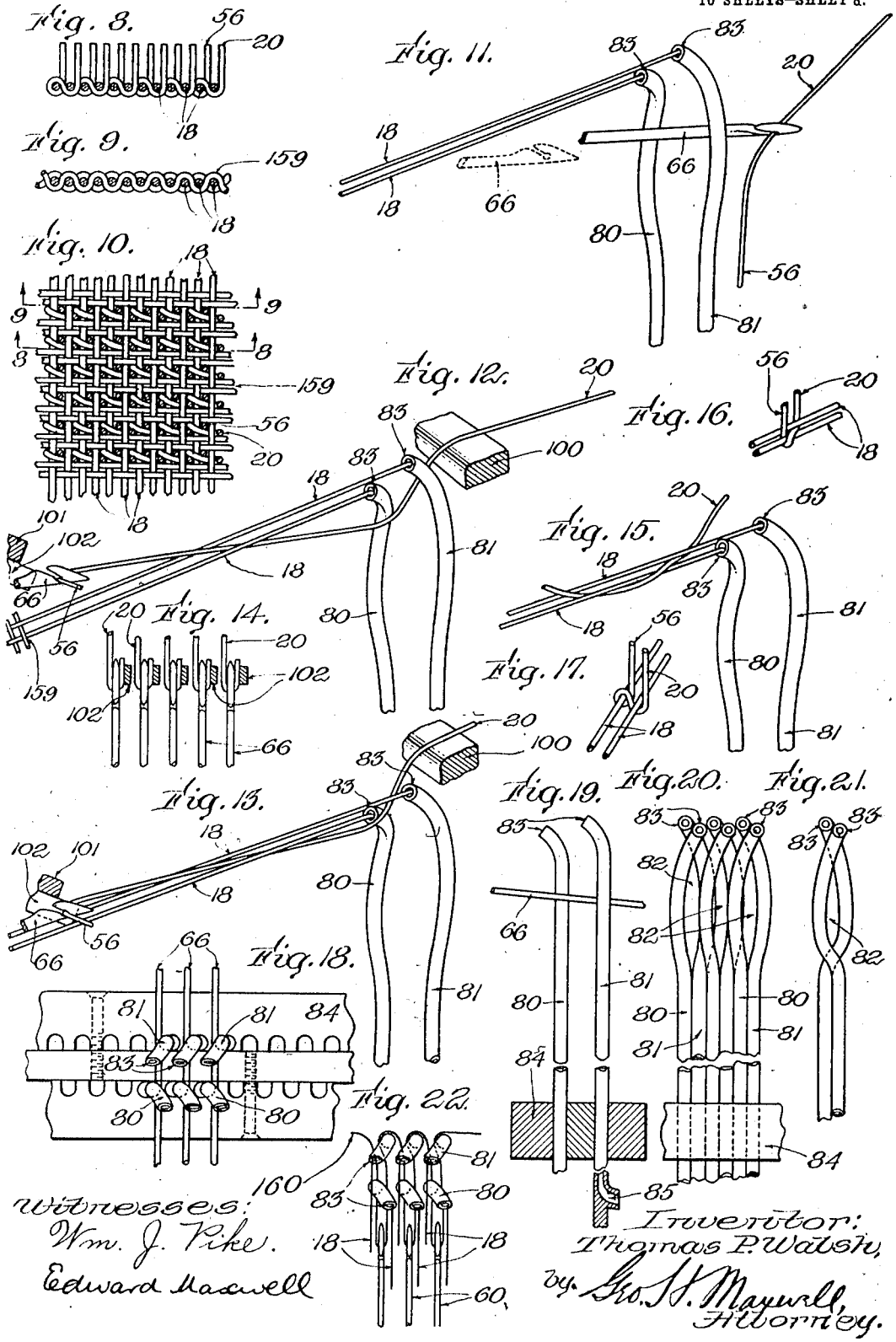

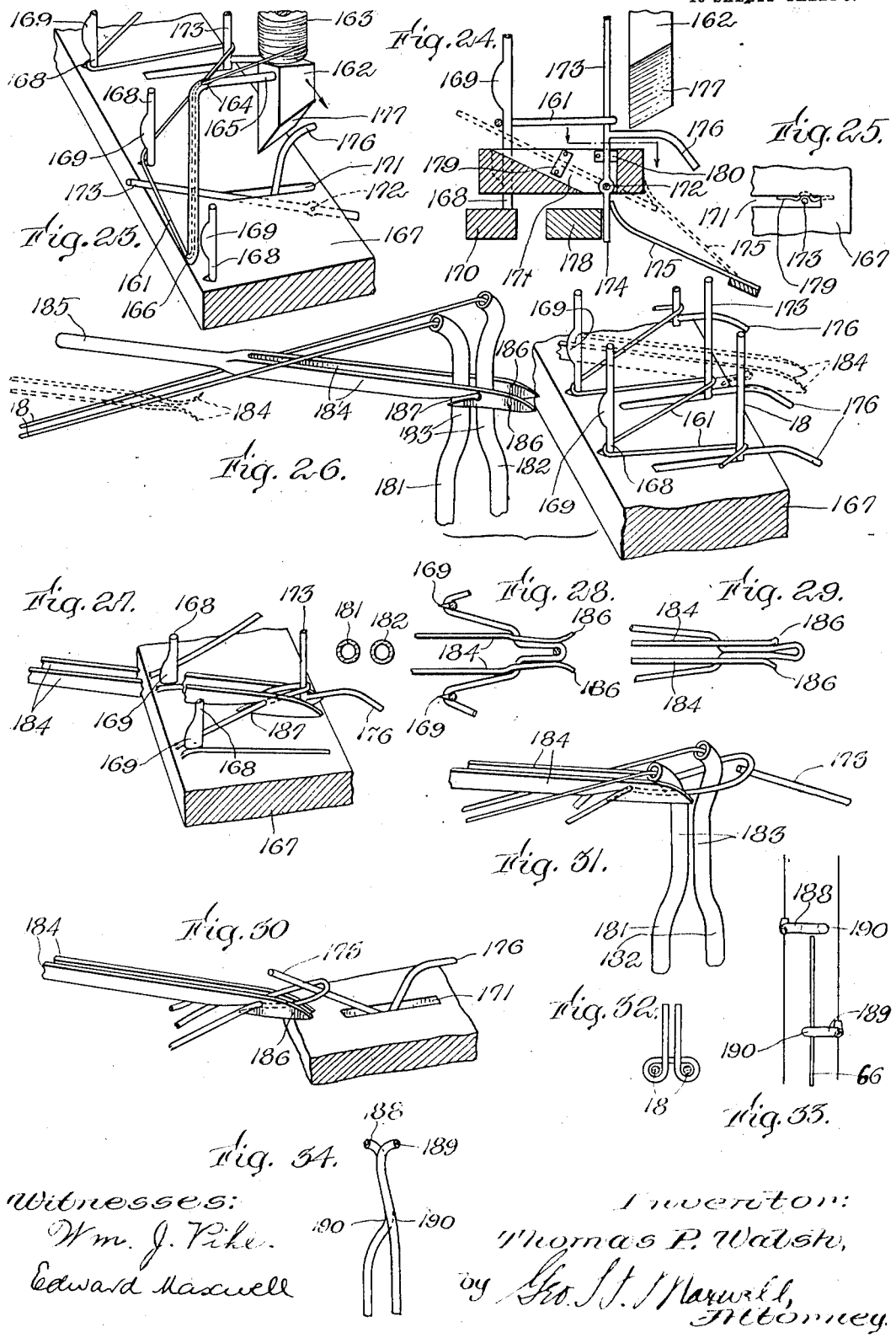

T. P. WALSH.
LOOM FOR WEAVING ORIENTAL KNOTTED FABRICS.
APPLICATION FILED AUG. 22, 1910.
1,071,973.
Patented Sept. 2, 1913.
10 SHEETS—SHEET 10.
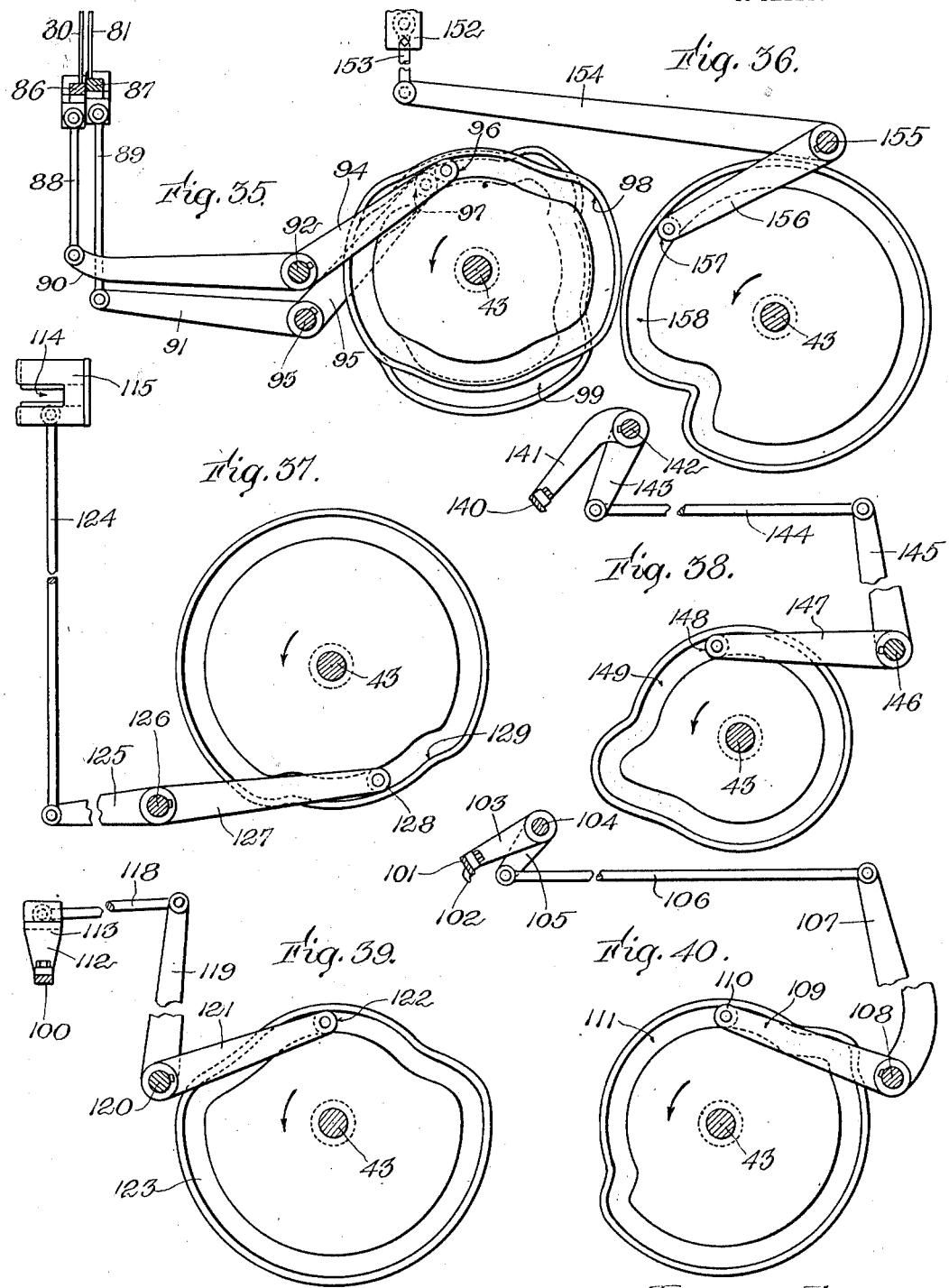

UNITED STATES PATENT OFFICE.

THOMAS P. WALSH, OF BOSTON, MASSACHUSETTS, ASSIGNOR TO WALSH-BAKER CORPORATION, OF PORTLAND, MAINE.

LOOM FOR WEAVING ORIENTAL KNOTTED FABRICS.

1,071,973.　　　　Specification of Letters Patent.　　Patented Sept. 2, 1913.

Application filed August 22, 1910.　Serial No. 578,410.

*To all whom it may concern:*

Be it known that I, THOMAS P. WALSH, a citizen of the United States, and resident of Boston, in the county of Suffolk and State of Massachusetts, have invented an Improvement in Looms for Weaving Oriental Knotted Fabrics, of which the following description, in connection with the accompanying drawings, is a specification, like letters on the drawings representing like parts.

The object of my invention is to produce a loom which will weave an oriental rug, carpet, or other oriental knotted fabric with extreme rapidity and efficiency, and which, besides being simple in its knotting mechanism and certain in its knotting and weaving movements, is capable of handling a practically unlimited number of colors and supply of color yarns.

In my present invention I have succeeded in producing a loom capable of accomplishing the above objects in a continuous uninterrupted weave in connection with the Persian knot, a knot which is regarded as the best type of oriental knot and the most difficult to accomplish with power mechanism.

A further advantage of my invention resides in accomplishing the knotting operation with one weaving movement, and also preferably the entire row transversely of the loom is woven or knotted simultaneously. Preferably this is accomplished without any stoppage of the loom between the knotting operation and the binding operation. Preferably also each row of piles is sheared evenly as it is woven.

I have endeavored to conform my mechanism in its general arrangement to that of the usual type of fly-shuttle looms, although it will be understood that I am not limited thereto. In this preferred embodiment of my invention, the warp threads are led from a warp beam through the loom over a breast beam to a take-up mechanism at the front, and the pile threads are delivered from any usual source, as a creel, to any suitable kind of pattern-selecting mechanism, herein shown as a jacquard mechanism, whence the selected threads are led through a reed to the knot-forming mechanism, the fly-shuttle mechanism driving such picks of binder thread as are desired.

Figure 2:
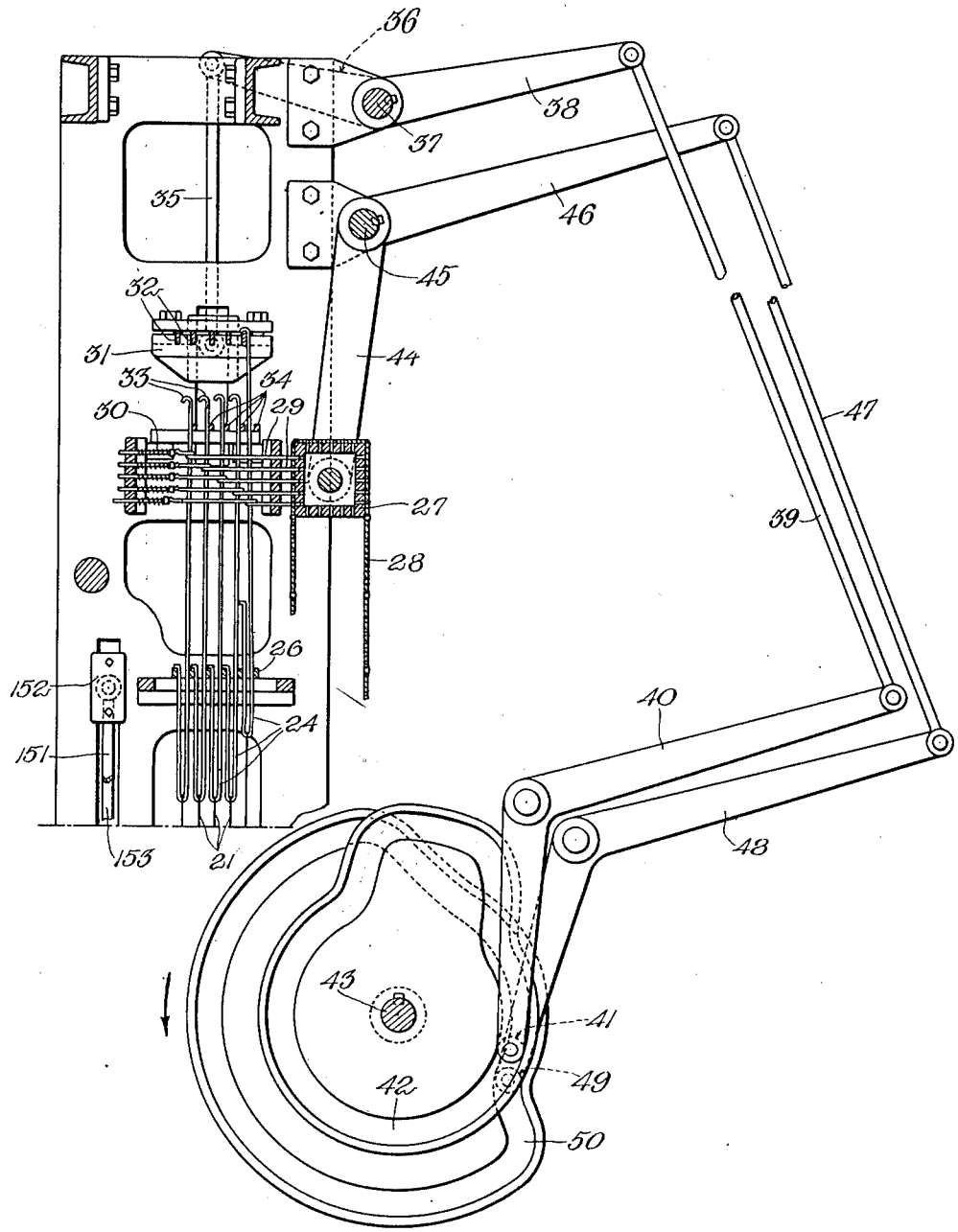
Figure 3:
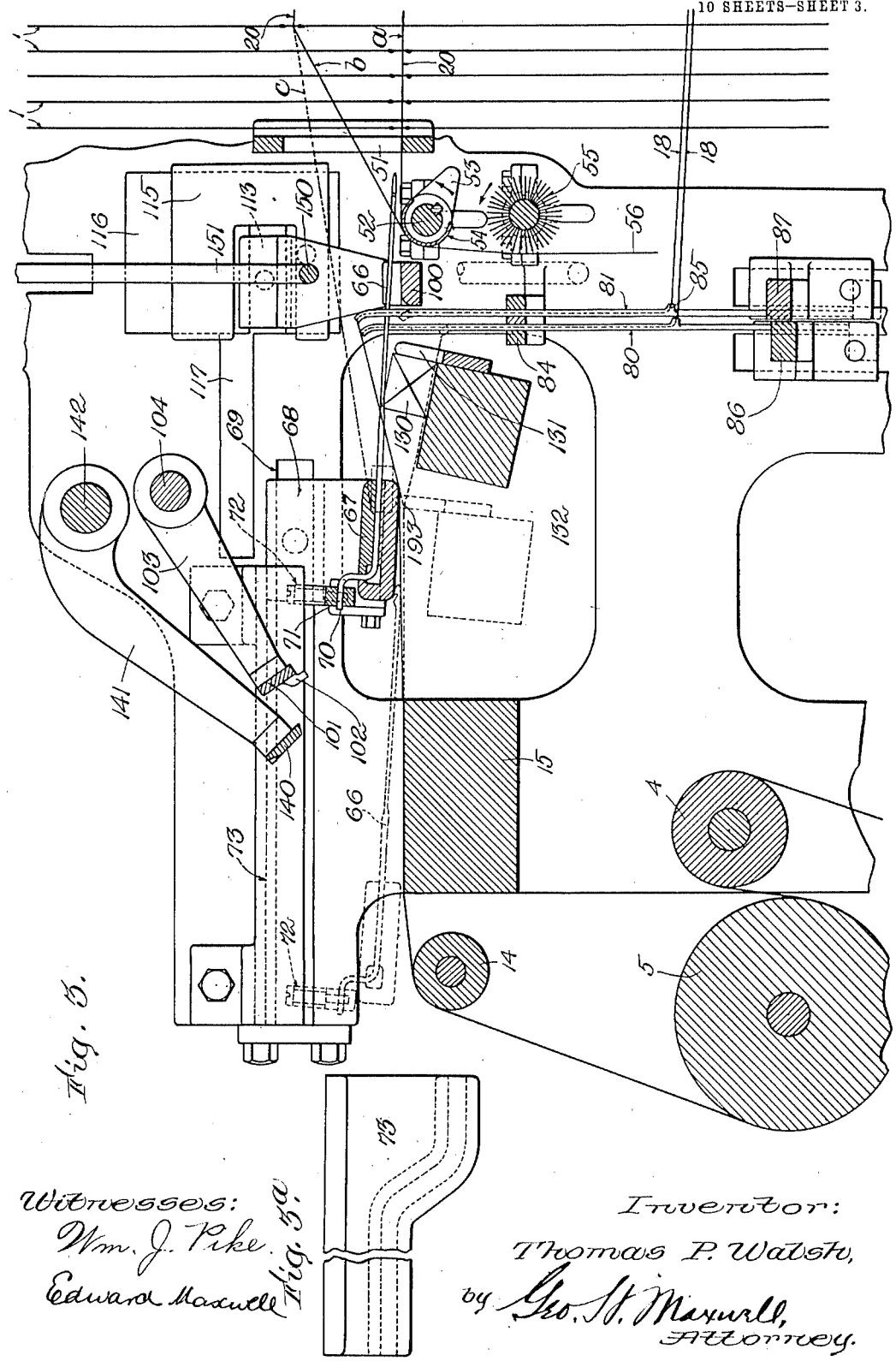
Figure 4:
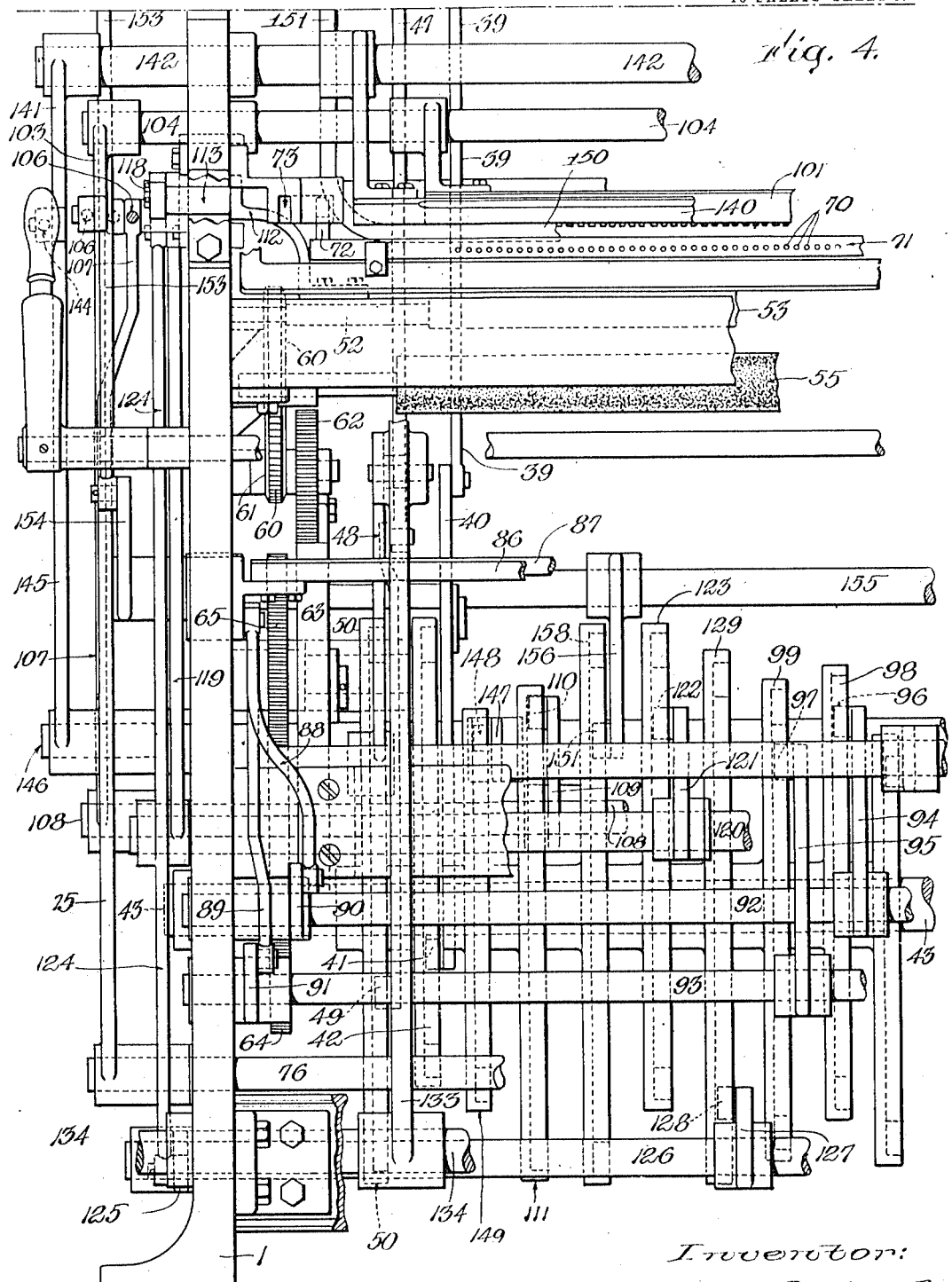

In the accompanying drawings, in which I have shown one embodiment of my invention, Figure 1 is a central vertical sectional view of the main part of the loom; Fig. 2 is a similar sectional view of the upper part of the machine; Fig. 3 is an enlarged sectional detail of the knotting mechanism, indicating in dotted lines its operation; Fig. 3ª is a detail in plan of a cam plate of Fig. 3; Figs. 4 and 5 are enlarged views in front elevation of the lower part of the loom, viewing the left hand and right hand portions thereof respectively, parts being broken away for convenience of illustration; Fig. 6 is a similar view in front elevation of the upper part of the loom shown in Fig. 2; Fig. 7 is a right hand end elevation of the loom showing the driving mechanism; Figs. 8 and 9 are cross sectional views of the weave, taken on the lines 8—8 and 9—9, Fig. 10 respectively; Fig. 10 is a top plan view thereof, the pile threads being sectioned for clearness of illustration; Figs. 11, 12, 13, and 15 are perspective views of the knot-forming mechanism in its successive operations; Fig. 14 is a horizontal sectional view showing the color-yarn holding means with relation to the drawing-hook ends; Figs. 16 and 17 are perspective views of the knot viewed from opposite directions, Fig. 16 showing the same as in Fig. 15 but more nearly complete; Figs. 18, 19, and 20 are views in top plan, side elevation, and front elevation respectively of the warp-carrying and color-thread-twisting devices, which also accomplish the shedding; Fig. 21 is a view similar to Fig. 20 showing a variation of arrangement in order to make my invention clearer; Fig. 22 is a diagrammatic view in plan of a modification; Figs. 23–31 are views showing my invention applied to weaving a Turkish knot with a filling pile, Fig. 23 being a fragmentary perspective view of a portion of the mechanism, Fig. 24 a cross sectional view thereof, Fig. 25 a horizontal sectional detail on the dotted line, Fig. 24, showing in top plan a holding spring, Fig. 26 a perspective view of the mechanism, the parts being in different operative positions from Figs. 23, 24, Fig. 27 being a fragmentary perspective view of the parts in a succeeding position, Figs. 28 and 29 showing certain of the parts in top plan in successive positions, and Figs. 30 and 31 perspective views showing certain of the parts in still subsequent positions; Fig. 32 shows in front elevation the Turkish knot; Figs. 33 and 34 are diagrammatic views of a modified arrangement of holders and drawing hook; Fig. 35 is a view in side elevation of the cam mechanism for operating the devices shown in Figs. 18–20; Fig. 36 is a view in side elevation of the cam mechanism for moving the color-yarn replacer; Fig. 37 is a similar view of a portion of the cam mechanism for the knot-positioner and shear-blade; Fig. 38 is a similar view of the cam mechanism for the other shear-blade; Fig. 39 is a similar view of the cam mechanism which coöperates with that shown in Fig. 37; and Fig. 40 is a similar view of the cam mechanism for operating the color-yarn holder.

Mounted in suitable end frames 1, 2 at the front of the loom is any usual kind of take-up mechanism 3, 4, 5, 6, 7, 8, 9, 10, 11, 12, 13, guide roll 14 and breast beam 15, and at the rear end of the loom is a usual warp beam 16 and whip roll 17 for delivering the ground warp threads 18, and tension rods 19 for delivering the color threads or tuft yarn or pile yarns 20 (from a creel or other suitable source, not shown). From the tension rods 19, the color yarns 20 are led through heddles 21 weighted at their lower ends by lingoes 22, said heddles being guided in a compart board 23 and provided with usual lifter wires 24, Fig. 2, coöperating with a usual guide frame 25 and its stop bars 26 and with a pattern cylinder 27, pattern chain 28, indicating wires 29, actuating springs 30, and with a lifter frame 31 and its knives or bars 32 to be engaged by the hooked ends 33 of the lifter wires 24, normally held against the stop bars 34 by the springs 30, said lifter frame 32 being lifted by links 35, arms 36, rock shaft 37, crank 38, link 39, and lever 40 whose cam roll 41 is actuated by a path cam 42 on the main cam shaft 43. The pattern cylinder 27 is actuated in usual manner by swinging arms 44 at the ends of a rock shaft 45 rocked by a lever 46, link 47, and crank 48 whose cam roll 49 is actuated by a path cam 50 on the shaft 43. In front of the heddles is a usual reed or other suitable yarn-guiding device 51. It is essential that the yarns 20 shall be maintained in true position at all times, and accordingly, as a convenient means for coöperating to this end with the reed 51, I provide just in front of the lower end thereof a revolving comb 52 provided with combteeth 53 at one side and preferably with a friction surface or yarn-drawing surface 54 at its other side, and a rotary brush 55 just beneath said comb so that the free ends 56 of the yarns 20 are maintained taut in absolutely correct position by the rotating brush and the revolving comb, the former preferably rotating continuously and the latter intermittingly, the brush being driven by a cross belt 57, Fig. 7, from a pulley 58 on the main drive shaft 59, and the comb being driven by a sprocket chain 60, Fig. 1, whose sprocket 61 is fast on a mutilated pinion 62 driven by a mutilated gear 63 operated from the shaft 43 by spur gears 64, 65. This comb and brush mechanism is claimed in my copending application Serial No. 546,325, filed February 28, 1910. The normal position of the yarns 20 is down practically on a horizontal line from the comb 52 to the tension rods 19, as indicated at $a$, Fig. 3. When the proper colors are selected by the pattern mechanism, thereby raising the corresponding color yarns to the inclined position $b$, the selected yarns are moved forward by any suitable moving means, that herein shown and preferred consisting of drawing hooks 66 mounted in a hook carrier 67 provided with sliding ends 68 mounted to reciprocate in guide-ways 69 in the end frames 1, 2. The drawing hooks are provided with upturned crank ends 70 mounted in a transverse bar 71 which is given longitudinal movement to rock said hooks by a cam roll 72 traveling in a stationary cam path 73, Figs. 1, 3, 3ª, and 4. Back and forth movement is given by links 74, Fig. 1, levers 75, rock shaft 76, and a cam lever 77 whose roll 78 is actuated by a path cam 79 on the shaft 43. As herein shown, in this preferred embodiment of my invention, the twisting or coiling of the selected color-yarns around the ground warp threads is accomplished as the former are being moved forward by the hooks to the fell. This coiling or twisting takes place back from the free ends of said selected yarns, as distinguished, for instance, from leading the free ends around the ground warp threads. Among the broadly novel features of my invention which makes the mechanism extremely simple, efficient, and practical is the provision of means for accomplishing this coiling or knotting of the color yarn about the ground warp threads entirely back from the free end of the color yarn as distinguished from moving the free end around or about the ground warp threads. In other words, while the color yarn is held at its two ends, I put the coils or twists into it between said ends, which results in its being knotted properly about the ground warp threads. Preferably this is accomplished while the two ground warp threads with which it is to be knotted are held stationary, and this holding of the two warp threads stationary in such a manner that they can coöperate with the above mentioned movement of the color thread to produce the desired oriental-knot weaves constitutes a second broadly novel feature of my invention.

The preferred means for holding the ground warp threads stationary in such a manner as to produce, in connection with the forwardly drawn color yarn, a coiling or twisting of the latter about the ground warp threads, consists of two ground-warp-thread holders which hold the warp threads in such a position that when the selected color yarn is drawn (by the hook 66 or any other moving means) between the ground warp threads from one side to the other and back again and is then slid along into pile-forming position, said three threads are thereby mutually interlocked or coiled about each other in the manner required to form the Persian knot. The ground warp threads remain stationary, and all the coiling movement takes place in the color yarn, and yet it takes place entirely back from the free end, and I accomplish this by providing such holding means for the pair of ground warp threads with which the color yarn is to be knotted that said ground warp threads are crossed over each other between the two points where the color yarn passes between them, said two ground warp threads having a continuous space between them, however, which permits the color yarn to have free coiling movement lengthwise of said two ground warp threads as its two portions which project on the same side of the ground warp thread are moved together to form the tuft-ends of the Persian knot. This holding means for the warp threads is herein shown as a needle-like device provided with a tortuous passage extending a sufficient distance to carry one thread laterally in one direction while the other thread is carried by a similar device laterally in the opposite direction to provide between them an opening for the passage of the hook 66 between the two ground warp threads which are thus held laterally apart, said two holders or needle-like devices carrying the threads across each other at their delivery ends so that they extend therefrom to the fell substantially parallel to each other but held in crossed-over position by said two holding devices between their laterally deflected or separated point where the needle passes through and the point where they emerge from or leave the two holding devices. This construction is best shown in Figs. 19 and 20, where it will be seen that the holders 80, 81 are arranged in pairs each having a deflected upper part to provide an opening 82 between them and having their upper delivery ends 83 crossed. In Fig. 21, the same construction is shown excepting that the lower part of each holder is on the same side of its pair as its upper or delivery end, so that the warp threads reach the fell in the same relative position that they leave the warp roll. The warp threads enter or are engaged and held within the tortuous passage of the holding devices at any point below the opening 82, herein shown as below a transverse guide beam or member 84, Fig. 3, where the needle-like devices are provided with a curved projecting throat 85 for facilitating the easy smooth entrance of the thread. The alternate holders are mounted to move vertically with relation to the others for the double purpose of accomplishing the shedding movement and to get out of the way of certain other moving parts of the mechanism, and accordingly the yarn holders 80 are mounted in a vertically sliding lifter or cross bar 86, and the holders 81 in a similar cross bar 87 actuated respectively by links 88, 89, arms 90, 91, rock shafts 92, 93, and cranks 94, 95 whose cam rolls 96, 97 are actuated by path cams 98, 99 on the cam shaft 43. For the knot-forming operation, all of the ground-warp-thread holders 80, 81 are lifted to the same raised position as shown in full lines, Fig. 3, whereupon the hook carrier 67 moves rearward so that all the hooks 66 pass through the openings 82, being rocked from the dotted position, Fig. 11, to the full line position ready to engage with the selected color yarns 20 at the beginning of the return forward movement. Each needle carries its color yarn forward through the opening 82 between the two laterally deflected portions of a pair of holders 80, 81 and up between the two parallel strands of ground warp threads to approximately the position shown in Fig. 12. While the selected color yarns are being thus drawn forward toward the fell, the ground-warp-thread holders 80, 81 are lowered so as to permit a knot positioner, herein shown as a transverse bar or rod 100, to deflect or slide the selected color yarns into coiled position with relation to the parallel strands of ground warp threads adjacent the fell. The beginning of this movement is shown in Fig. 12, and as said movement brings more or less rearward pull upon the selected color yarns, which would tend to pull their free ends out of the hooks, I provide a color-yarn holder or clamp which locks the said free ends into the notches of the hooks or against their sides temporarily, so that, while said yarns are subjected to this rearward pull, they will not be disengaged from their hooks. This color-yarn holder consists of a transverse bar or plate 101 provided on its under side with a series of fingers or teeth 102 spaced apart a proper distance to straddle the respective needles and slightly wedge against the adjacent portions of the bent yarn which is carried by each needle, as clearly shown in Fig. 14. This color-yarn holder swings rearward until almost in clamping engagement with the yarns and hooks, and then moves forward with the hooks but at a very slightly slower speed, so as to insure an absolutely perfect clamping engagement with the yarn while the knot positioner 100 is accomplishing its forward movement. The color-yarn holder or clamp is mounted at the lower ends of arms 103 given a swinging movement by a rock shaft 104 actuated by end cranks 105, see Fig. 40, links 106, arms 107, rock shaft 108, and a crank arm 109 whose cam roll 110 travels in a path cam 111 on the shaft 43.

The knot positioner 100 is a transverse bar or rod carried by end pieces 112 having outwardly extending flanges or guide portions 113 fitting loosely in a horizontal recess 114 in a jaw-like carrier 115, Fig. 37, sliding vertically in a way 116 in the adjacent end frame, so that when said carriers 115 have raised the end pieces 112 to their top position, said guide portions 113 are in line with a horizontal slot or way 117 and free to travel horizontally therein. This horizontal movement is communicated by a link 118 connected to the outer end of each guide portion 113 at one end, and at its other end to an arm 119, Fig. 39, on a rock shaft 120 provided with a crank 121 whose cam roll 122 travels in a path cam 123 on the shaft 43. The said vertical movement of the knot positioner and its carrier 115 is given by links 124 connected to the carriers 115, arms 125, Fig. 37, a rock shaft 126 and crank arm 127 whose cam roll 128 travels in a path cam 129 on said shaft 43. The result is that the knot positioner 100, which at first is down low so as to permit the hooks 66 readily to pass over it, is raised somewhat after said hooks have moved forward out of the way until it is above the level of the hooks 66, this depending somewhat on the length of pile or tuft desired. Then, the ground-warp-thread holders 80, 81 having been lowered, the knot positioner 100 is moved forward by the mechanism shown in Fig. 39, sliding the coils of color yarn along on the ground warp threads from the position shown in Fig. 12 to the positions shown in Figs. 13 and 15 until finally said coils are moved or slid up to the fell with a beating action up this bar 100 to the completed knot position shown in Figs. 16 and 17. The forward ends of the clamping fingers 102 project beyond their plate 101, as clearly shown in Fig. 3, and are still in their locking or clamping position, so that as the knot positioner 100 moves forward, it can shove the yarns into close alinement so that the pile ends which are bent over the front edge of said bar 100 are in practical alinement with the free ends thereof which are being clamped by the fingers 102 against the hooks 66. The parts halt in this position while the shed is made as shown in Fig. 3, whereupon a binder filling 159 is shot across the loom by a shuttle 130, and then beaten up by a beating-up comb 131.

I have not herein shown all the constructional details of the shuttle mechanism, as it is of any usual or preferred kind, an ordinary lay 132 being herein indicated supported on lay swords 133 pivoted at 134 and actuated by usual links 135, arms 136, rock shaft 137, cam lever 138, and cam 139.

The shedding movement is accomplished as follows: The ground-warp-thread holders which are warp-carrying and color-thread twisting or coiling devices 80, 81 are first all raised while the color threads are placed in proper position by the hooks 66 for the coiling or knotting movement, and then said members 80, 81 are all lowered, half of them, the members 80, for instance, going to their extreme downward limit, and the others, the members 81 moving half way down as shown in dotted lines, Fig. 3. They remain in this position while the knot mover or positioner 100 is moving all the drawn-forward color yarns toward their coiled or knotted positions at the fell, whereupon the ground-warp-thread holders 81 are raised to their upward limit so that the shed is thus formed by the fully raised holders 81 and the fully lowered holders 80. The binder filling is then shot across the loom and beaten up as stated, and a reverse shed is then formed by fully raising the previously lowered holders 80 and lowering the previously raised holders 81, whereupon a return shot of binder filling is put across the loom and beaten up. Both sets of ground-warp-thread holders 80 and 81 are then brought to an intermediate or central horizontal position. While the second thread of binder filling is being beaten up, the clamping device or color-yarn holder 101, 102 is swung back to its original position as shown in full lines, Fig. 3, releasing the free ends of the now knotted color yarns, whereupon the hooks move forward out of engagement with the color yarns. As soon as these parts are moved out of the way, a knife or shear blade 140 swings downward and forward into coöperating shearing engagement with the front lower edge of the knot positioner 100, which thus constitutes one shear blade of the shearing device. This severs the knotted tuft from the main supply color yarns. The shear 140 is carried by swinging arms 141 actuated by a rock shaft 142, arms 143, Fig. 38, links 144, arms 145, rock shaft 146, and a cam lever 147 whose cam roll 148 travels in a path cam 149 on the cam shaft 43. The selected color yarns, having now been severed, are ready to be returned to their original position among the unselected color yarns, and accordingly the lifter frame 31 and its knives 32 of the jacquard mechanism are lowered and at the same time the previously selected color yarns are shoved positively downward by a transverse rod or color-yarn replacer 150 whose upturned ends 151, Figs. 4 and 5, are secured to slides 152, Figs. 2 and 6, actuated by links 153, see also Fig. 36, arms 154, rock shaft 155, and cam lever 156 whose roll 157 travels in a path cam 158 on the cam shaft 43. Meanwhile the comb 52 has revolved sufficiently so as to engage its comb teeth 53 with the color yarns and has moved into proper position to receive the previously selected color yarns in their correct relation. In other words, I provide mechanism for positively maintaining all the color yarns at all times in properly positioned relation. The replacer 150 presses against said yarns sufficiently to prevent their accidental displacement in any way, and they are immediately received by the comb 52, which holds them in accurately positioned relation to the others until the replacer 150 has moved down to its dotted line position, Fig. 3, thereby bringing the ends of the previously selected yarns into engagement with the brush 55 which immediately places all of the yarns under the same uniform tension and maintains until the jacquard mechanism selects another set of color yarns in accordance with the pattern. As soon as the replacer 150 has performed its function, it immediately moves back to its top position and the knot positioner 100 moves rearward horizontally and then down to its full line position, Fig. 3.

While I prefer to employ a series of color yarns, with the consequent advantages of the jacquard, it will be understood that I am not limited thereto; as my oriental-knot-forming mechanism may be employed with a weft yarn 160 (laid just back of the hooks by any suitable weft-carrying mechanism) as shown diagrammatically in Fig. 22, in which case the hooks 66 need not be rocked, as they would already be in position to engage transversely of the yarn 160.

In order that the applicability of my invention, in its general aspects, to weaving the various kinds of oriental knots may be more readily understood, I have shown in Figs. 23–31 such modifications as are desirable for enabling the general mechanism to weave the Turkish knot shown in Fig. 32. In weaving this knot, I prefer to employ a filling pile or weft pile thread 161, which is moved across the loom and then pulled, preferably simultaneously, laterally to form the required number of pile loops. As herein shown (Fig. 23), I provide a depending member 162 arranged to reciprocate back and forth across the loom. Said member carries a spool 163 of said weft yarn or thread 161, which is threaded into an opening 164 of a thread guide 165 which extends forward from said member 162 and thence downward, being hollow in its downward portion to guide the thread 161 from the opening 164 down and thence out at the lower end 166 thereof. This member 162 reciprocates lengthwise of a stationary transverse plate 167 of the loom, in the front edge of which is mounted to reciprocate a series of vertically sliding fingers 168 each provided with a knife edge 169 and reciprocated by a vertically moving bar 170. At intervals, the plate 167 is provided with transverse vertical slots 171 separated in accordance with the spaces between the fingers 168 (said fingers and accompanying mechanism being provided in accordance with the desired knots per inch in the weave), and in each slot is pivoted at 172 a puller arm or slack former 173 having a tail piece 174 normally engaged by a spring 175 and also provided with a laterally bent trip or projection 176 to be engaged by the oblique surface of the cam end 177 of the member 162. In front of the end piece 174 is a bar 178, which has a horizontal bodily movement forward and backward lengthwise of the loom for actuating the slack former 173 in opposition to the spring 175. Notch-forming pieces or detents 179, 180 serve to hold the arm 173 in its forward and back positions respectively. In front of each slot 171 is a pair of ground-warp-thread holders 181, 182 having the same construction and function as the holders 80, 81 excepting that they are mounted in longitudinal alinement or bent toward each other at 183 (instead of away from each other, as before) to be spanned or embraced by the spring blades or twin-hooks 184 of the drawing hook 185, said blades 184 having their free ends bent away from each other as indicated at 186 and each provided with a hook or thread slot 187. Thus it will be understood that when the pile thread 161 is being moved across the loom by the member 162 in front of the fingers 168, the cam end 177 of said member 162 engages the cam ends 176 of the slack formers 173 one after the other, thereby turning the latter upward from their horizontal position to their vertical position so as to produce the requisite slack in said weft thread or zigzag formation, as clearly shown in Fig. 26. As soon as the pile thread 161 has been thus formed and the member 162 has passed entirely across the loom, the drawing hooks 185 move rearward from the fell in the position shown in dotted lines at the left, Fig. 26, and then turn so as to bring the spring blades 184 from vertical alinement into horizontal alinement, as shown in full lines, Fig. 26, their flaring ends 186 causing the rotated blades to pass at either side of the warp-thread holders 181, 182, as clearly shown in Fig. 26, said blades continuing rearward to their dotted position at the right of Fig. 26 and thence moved downwardly and back again, catching the two rearward strands of the pile thread in the notches of the two blades 184, as shown in Fig. 27, whereupon, said thread strands being thus held, the knife fingers 168 are moved downward, thereby severing the pile thread as shown in Fig. 27. As soon as this cutting operation is performed and while the drawing hook blades are moving forward, the bar 178 moves rearward, thereby turning the slack formers 173 from their upright position, Fig. 27, to their inclined position, Fig. 30. This movement of the slack formers prevents the cut pieces of pile thread from being pulled away from the drawing hooks, and also acts as a guide to start the loop end (which is to form the knot) up over the knot-forming ends of the warp-thread holders, as shown in Fig. 31. The blades 184 tend to spring together, thereby holding more firmly the pieces of pile threads. As already stated, the coiling of the color thread into the desired oriental knot is not dependent upon the crossing of the coöperating threads with which the color yarn is tied. For instance, it is not necessary that the warp threads shall be crossed, but only that the color yarn, when being delivered in a general direction lengthwise of the warp threads and passed from one side of the web to the other side thereof and out to the first side again, shall pass transversely between a pair of the warp threads so that it is next to their contiguous or inner sides in going from one side, and, in going from the other side, shall pass next to the diametrically opposite sides of said respective warp threads. To make this clearer or more easily understood, I have shown in Figs. 33, 34 diagrammatically a construction for accomplishing the same weaving with no crossing of the warp threads, in which warp-thread holders 188, 189 are shown having bent portions 190 in vertical longitudinal alinement with each other, so that the hook, in going diagonally downward between the two warp threads and then past the two holders 188, 189, will pass on the right hand side of the front holder at the upper portion of its bend and then on the left hand side of the rear holder at the lower portion of its bend, thereby passing on the opposite or outer side of the warp thread contained in said holder 189, and then in meeting the deflection 190 of the holder 188, it passes on the opposite or outer side of the warp thread contained in the holder 188, and, having engaged a color yarn (in the manner already described), it pulls the color yarn in the same relation to the warp threads when the hook is reversed in its movement or pulled back again toward the front of the loom. The color yarn is thus caused to pass transversely between the pair of warp threads next to their contiguous or inner sides at one point in its travel and on the diametrically opposite sides of said respective warp threads at another point in its travel, so that, when thereafter moved to the fell by the knot positioner, it passes under one warp thread of a pair of warp threads and over and then under the other warp thread and out between the two warp threads constituting the pair as required to make the knot.

Referring now to the preferred or main embodiment of my invention (in which a Persian knot is tied), the ground warp threads are delivered from the warp beam 16 over a usual whip roll 17 and then deflected so as to form hook openings 82 between each pair of ground warp threads as shown in Figs. 20, 21, by being passed through the ground-warp-thread holders or carrying and color-thread twisting devices 80, 81, passing therethrough from the entrance throats 85 up through the tubular portions of the holders to and out at the crossed delivery ends 83, and thence preferably parallel to the fell and, in the completed fabric, over the breast beam to the take-up mechanism. The color yarns are delivered from a usual creel or any other suitable source, providing the desired variety of color yarns according to the complexity of the pattern, the yarns passing through the tension bars 19, heddles 21, reed 51 and thence over whatever kind of positioning, straightening, and tightening mechanism may be employed; herein shown as passing over the revolving comb 52 and down past the constantly rotating brush 55 where the free ends 56 terminate.

Any suitable kind of pattern mechanism may be employed, other than that herein shown, although I prefer a jacquard pattern mechanism because of its convenience and proved reliability in bringing any yarn at any time or indicating any thread at any time desired, or in causing the weaving of contiguous ends to form a row entirely across the loom or not, omitting any number of knots in said row, either scattered or together. I mention this, in order to show the wide range of oriental weaving effects made possible by my loom. For instance, my loom renders it possible to accomplish with oriental knot weaving the general effects of tapestry, brocade, and embossed or embroidery work, where the figures are raised or prominent in the form of piles or tufts and the ground pattern is smooth and thinner or lower. In other words, all the multitudinous varieties of pattern work capable of being accomplished by the jacquard or other selective mechanism may be woven by my loom in the form of oriental weaving, thereby not merely producing a new power loom fabric but getting all the advantages as to strength, permanence, etc., of the oriental weave.

Let it be supposed that the pattern cylinder 27 is swung forward to the position shown in Fig. 2, and that its pattern chain 28 has selected the rearmost heddle, which accordingly has been raised by the knife frame or lifter frame 31 to the position shown in Figs. 1–3, thereby raising a selected yarn from its previous position *a* to its inclined position *b*. The hook carrier 67 now moves forward with its hooks, and as said hooks pass over the fell (so as not to be able to interfere with what has been woven), the ground-warp-thread holders 80, 81 are raised to the full line position Fig. 3, the hooks 66 passing through the openings 82 and turning in time to be certain of grabbing the raised color yarns upon the forward return movement of said hooks (Fig. 11) which at once turn back again vertically just before they pass back through the openings 82. The color-yarn-holder or locking clamp 101, 102 swings downwardly as the hooks 66 with their selected color yarns move forward, meeting the latter just rearward of the fell 193 (Fig. 3) and then returning forward with said hooks in wedged locking engagement with the respective color yarns as shown in Fig. 14. At the same time, the knot positioner and shearer 100 is rising from the position Fig. 3 (where it has previously remained so as not to interfere with the movement of the hooks), and the ground-warp-thread holders 80, 81 are being lowered, said positioner 100 passing over and forward of the same as soon as they have been lowered approximately in the horizontal plane of the fell, said positioner continuing forward with a somewhat rapid movement, until all the selected color yarns have been moved forward along the ground-warp-threads and their coils formed and drawn tight at the fell in the position shown in Figs. 16, 17, where said positioner 100 then rests with its front edge over the rearwardly projecting ends of the clamping fingers 102. In other words, both pile portions of the knot-forming strands are now accurately positioned in alinement with each other transversely of the loom at the fell, the selected yarns being in the position Fig. 3. Meanwhile the holders 80 have continued their downward movement to their lowermost position and the holders 81 have returned to their uppermost position, thereby opening or forming the shed through which the shuttle 130 then delivers a pick of binder filling 159, which is at once beaten up by the comb 131, which moves from its full line to its dotted line position, Fig. 3. During this beating-up movement of the comb 131, the holders 80, 81 reverse their positions, arriving approximately halfway in their movements so that their respective warp threads are all in the same horizontal plane at the moment that the comb 131 arrives at the fell. As the comb is returning rearward to its full line position, Fig. 3, the holders 80, 81 complete their said reverse movement, thereby forming a second shed, the shuttle is driven in the reverse direction, thereby laying a second pick of binder filling, which is immediately beaten up by the comb 131 as before, and the holders 80, 81 come again to their middle position, where they dwell. It will be understood that I have arranged the mechanism to weave one row of pile alternating with two rows of binder thread, because this is the regular or accepted weave in standard oriental rugs, but I do not intend to limit my invention in this respect, as it is obvious that the number of picks of binder thread to a given order or number of rows of knotted pile may be varied to suit special requirements. For instance, at the beginning and end of the rug, it is desirable to weave a comparatively broad strip or border without piles, which is accomplished by simply arranging the pattern card not to indicate any color yarns. While the binder picks are being delivered and beaten up, and preferably during the latter portion of said operation, the pattern cylinder 27 is swinging rearwardly and turning over, and the lifter frame 31 is being lowered so as to restore the selected yarns from their position *b* to their position *a*, Fig. 3. Also at the same time the color yarn holder 101, 102 swings forward away from its previous clamping position at the fell (as the tuft-forming color yarns are now held by the binder thread) and the hooks 66, being no longer needed, move forward away from the fell into their dotted position, Fig. 3, and the shear blade 140 swings rearward into coöperating relation with the knot positioner and shear 100 at the fell, thereby shearing all the color yarns. Said color yarns now being released, and the revolving comb 52 having started to turn in the direction indicated by its arrow, Fig. 3, so that, by about the time said color yarns are cut, it is in proper engagement therewith so as to hold them in true longitudinal position, the color yarn replacer 150 moves quickly downward from its full line position to its dotted line position, Fig. 3, and back again, thereby shoving all of said yarns down into engagement with the brush 55, which puts them straight and under the same tension as the rest of the color yarns, ready for a further selective operation and repetition of the weaving movements. During this down and up movement of the replacer 150, the two shear blades 100 and 140 are returned to their original positions as shown in full lines, Fig. 3. When the selected color yarns are being moved from their raised position *c* to their position *a*, Fig. 3, before they are cut, they enter between the raised holders 80 and then constitute a comb-like retainer, tending to prevent said yarns from springing or flying out of alinement with each other when they are cut. Worsted yarns are principally used in this kind of rug making or carpet weaving, and these yarns, when they have a free unrestrained end, are very apt to twist, fly and tangle. Accordingly, by timing the parts so that the yarns are brought down into the raised holders just before or as they are being cut, said holders serve to retain the yarns in proper position, in conjunction with the revolving comb 52 until the replacer 150 engages said yarns between said two comb-like devices and rapidly pushes the yarns downward until they are caught and held taut by the brush 55. To prevent the yarns from tending to snap back as would be the case if they were under tension when cut, I time the downward movement of the heddle so that the raised selected yarns are brought downwardly to their horizontal position or at least sufficiently to eliminate tension therefrom just prior to the cutting of the yarns.

From the foregoing description, it will be understood that the weaving movement is entirely automatic and continuous, there being no hand operations or loom stoppages required. Also my mechanism accommodates itself to a practically unlimited variety of colors and quantity or supply of color yarns. The knot weaving, or rather the formation of both coils of any given knot in each color yarn is automatically accomplished simultaneously for both coils, between the binder picks, or by one movement of the yarn for both coils about the two separate ground warp threads (which together constitute the complete knot). Besides this novel feature of my weave (and of the mechanism for accomplishing it), a further novel feature resides in providing means for accomplishing the formation of both coils of any given knot with each yarn end automatically and simultaneously for both coils, between the binder picks, or by one movement of each yarn end for both coils about the two separate ground warp threads before the severing of said yarn end from its main body of color yarn. Also, I weave an oriental knot, carry it to the fell, and bind it in, and then cut or shear each row prior to weaving the next row. Besides these broader features, my invention possesses various other features of novelty, all of which will appear more fully from the following claims, and furthermore it will be understood that, within the limits of said claims, a wide variety of mechanical changes in form, arrangement, and combination of parts may be resorted to without departing from the spirit and scope of my invention.

It will be understood that I have used the word color yarn not primarily to indicate that the yarn possesses a color characteristic, but to distinguish the coil-forming yarn conveniently from the threads around which it is coiled, irrespective of whether said yarns form actual piles or tufts or not in the woven fabric, and irrespective of whether they run lengthwise of the loom or transversely of the loom.

My present loom, as herein shown, is of the same general type or construction as shown in my concurrent application, which contains the broad claims which cover the features common to both applications.

Having described my invention, what I claim as new and desire to secure by Letters Patent is:

1. In a loom, a source of general supply of yarns from which to make selections for different patterns, selective pattern mechanism to select desired yarns from said supply, and mechanism to weave the selected pattern yarns into the woven fabric, including means operating by a single unidirectional movement lengthwise of the loom for tying the selected yarns into the fabric in oriental knots in transverse rows across the fabric, means to position the knots at the fell, and means for severing the yarns from each row before another row is tied.

2. In a loom, a source of general supply of yarns from which to make selections for different patterns, selective pattern mechanism to select desired yarns from said supply, mechanism to weave the selected pattern yarns into the woven fabric, including means for tying the selected yarns into the fabric in oriental knots in transverse rows across the fabric, means for laying binder filling to bind the coiled yarns at the fell, means for moving the coiled yarns to the fell prior to said laying of binder filling, and means operating at the fell for severing the yarns from each row before another row is tied.

3. In a loom, a source of general supply of yarns from which to make selections for different patterns, selective pattern mechanism to select desired yarns from said supply, and mechanism to weave the selected pattern yarns into the woven fabric, including means operating by a single unidirectional movement lengthwise of the loom for simultaneously tying the selected yarns in to the fabric in oriental knots in transverse rows across the fabric, means to position the knots at the fell, means for thereafter laying binder filling to bind in said knots, and means for severing the yarns from each row before another row is tied.

4. In a loom, a source of general supply of yarns from which to make selections for different patterns, selective pattern mechanism to select desired yarns from said supply, knot-weaving mechanism to automatically and simultaneously bend and coil the selected pattern yarns about the ground warp threads with one forward movement of said color yarns, said mechanism including means to coil each color yarn about a pair of ground warp threads in an oriental knot and means to move the coiled yarns tight up to the fell, and binder-filling weaving mechanism for binding said woven color yarns and ground warp threads into a woven fabric.

5. In a loom, a source of general supply of yarns from which to make selections for different patterns, selective pattern mechanism to select desired yarns from said supply, knot-weaving mechanism to automatically and simultaneously bend and coil the selected pattern yarns about the ground warp threads with one forward movement of said color yarns, said mechanism including means to coil each color yarn about a pair of ground warp threads in an oriental knot and means to move the coiled yarns tight up to the fell, binder-filling weaving mechanism for binding said woven color yarns and ground warp threads into a woven fabric, and automatic cutting mechanism for severing the knotted color yarns after the laying of a binder filling.

6. In a loom, weaving mechanism for weaving ground warp threads and filling threads, combined with a source of general yarn supply for supplying color yarns to be woven into the fabric, mechanism for weaving said color yarns into the fabric in the form of oriental knots, including yarn-moving means for engaging and disengaging by a continuous forward movement the free ends of the color yarns as the weaving progresses, and pattern selective mechanism for selecting the yarns to be woven in oriental knots.

7. In a loom, weaving mechanism for weaving together ground warp threads and filling threads, combined with a source of general yarn supply for supplying color yarns to be woven into the fabric, mechanism for weaving said color yarns into the fabric in the form of oriental knots, including means for engaging the free ends of the color yarns prior to the coiling thereof and maintaining engagement therewith until the knots are tied complete, mechanism coöperating with said engaging means to coil each color yarn about a pair of ground warp threads in said oriental knot, means to position the knots at the fell, and pattern selective mechanism for selecting yarns to be woven in said oriental knots.

8. In a loom, means for supporting the ground warp threads at their opposite ends, means for interweaving filling threads with said ground warp threads, a source of general supply of yarns from which to make selections for different patterns, means for delivering a series of color yarns with their free ends in position to be engaged for each weaving operation, pattern selective mechanism for selecting the color yarns to be woven, mechanism for engaging the free ends of the selected yarns and coiling said yarns about certain of the threads in the fabric as it is being woven and locking means to unremittingly lock the yarns to the said engaging mechanism while being moved thereby.

9. In a loom, means to support ground warp threads at their opposite ends, means to furnish a general supply of color yarns from which to make different selections with their free ends in position at all times to be selected, pattern selective mechanism to select from said color yarns those to be woven, knotting mechanism for coiling the selected yarns about the ground warp threads, and including means to hold the free ends of said selected yarns, and coöperating mechanism for accomplishing all the bending movements for knotting said color yarns about the ground warp threads while the free ends of said color yarns are so held, severing mechanism, said knotting mechanism operating simultaneously on all the selected yarns throughout a given row, and means for laying binder thread to bind in all the knots of said row after it is woven and before the color yarns are severed.

10. In a loom, means to support ground warp threads at their opposite ends, means to furnish a general supply of color yarns from which to make different selections, pattern selective mechanism to select from said color yarns those to be woven, knotting mechanism for coiling the selected yarns about the ground warp threads, including means to hold the free ends of the selected color yarns, and means to move said holding means, while still holding said free ends, forward to the fell in the process of coiling the yarns, means for laying binder thread to bind in all the knots of said row after it is woven, and severing means for severing said woven yarns after said binding thread is laid and prior to the knotting of another row of color yarns.

11. In a loom, means to support ground warp threads at their opposite ends, means to furnish a general supply of color yarns from which to make different selections, pattern selective mechanism to select from said color yarns those to be woven, knotting mechanism for coiling the selected yarns about the ground warp threads, said knotting mechanism operating simultaneously on all the selected yarns throughout a given row, means for laying binder thread to bind in all the knots of said row after it is woven, means for holding the free ends of the color yarns for the coiling and until after they are bound, and severing means for severing said woven yarns after said binding thread is laid and prior to the next knotting operation.

12. In a loom, mechanism for supporting the ground warp threads for weaving, means to furnish a general supply of color yarns from which to make different selections, pattern selective mechanism for selecting and delivering color yarns with their free ends always in position to be moved between the warp threads, means for moving said selected color yarns between the warp threads, and coöperating knot-forming mechanism for coiling each delivered selected color yarn about two of said warp threads in the form of an oriental knot, the aforesaid mechanisms including means for forming all the bends in the color yarns required in the process of making said knot in the body of said color yarn back from and independent of the ends of said color yarn.

13. In a loom, mechanism for supporting the ground warp threads for weaving, means to furnish a general supply of color yarns from which to make different selections, pattern selective mechanism for selecting from the said supply of color yarns certain thereof for a weaving operation, and coöperating knot-forming mechanism for coiling each selected color yarn about the adjacent ground warp threads in the form of an oriental knot, the aforesaid mechanisms including means for forming the bends for said knot in the body of said color yarn back from and independent of the ends of the color yarn, said loom having means for positively engaging and holding said color yarn on both sides of said body portion and of the knot next to the knot while the knot is being formed between the parts of the color yarn thus held.

14. In a loom, mechanism for supporting pairs of ground warp threads approximately parallel to each other, pattern selective means for selecting from among unattached color yarns certain thereof to be woven into the fabric, means for delivering said selected color yarns and laying them between and lengthwise of the warp threads at each knotting operation, and coöperating mechanism to move each color yarn to the fell and simultaneously coil the same about the adjacent two ground warp threads in oriental-knot formation while the two ends of the color yarn at each side of the body being coiled are positively held.

15. In a loom, pattern-selective mechanism to select from among a supply of unattached color yarns certain thereof to be woven, knot-weaving mechanism to automatically and simultaneously coil a selected series of said unattached color yarns about the ground warp threads with one forward movement of said color yarns, said mechanism including means to coil each color yarn with said forward movement about a pair of ground warp threads in an oriental knot, and binder-filling weaving mechanism for binding said woven color yarns and ground warp threads into a woven fabric.

16. In a loom, warp-thread-supplying means for delivering warp thread as fast as the weaving progresses, take-up mechanism for moving the fabric away from the weaving region of the loom as the fabric is made, means for laying binder filling in woven relation to the warp threads, means to hold the free ends of a selected series of color yarns, means to furnish a general supply of color yarns from which to make different selections, pattern selective means for selecting said yarns from said supply of color yarns, and mechanism for knotting said series of color yarns about said ground warp threads while the latter are stationary and between the supported ends of the latter while the free ends of the color yarns are so held.

17. In a loom, warp-thread-supplying means for delivering warp thread as fast as the weaving progresses, take-up mechanism for moving the fabric away from the weaving region of the loom as the fabric is made, means for laying weft thread in the fabric, means to hold the free ends of a selected series of color yarns in proper relation to the aforesaid threads to be woven into the fabric, a source of general supply of yarns from which to make selections for different patterns, pattern selective mechanism for selecting said color yarns from said supply of color yarns and maintaining a hold on the selected yarns during their weaving operation, and mechanism for knotting said series of color yarns about certain of the aforesaid threads while the color yarns are so held at their opposite ends and while the warp threads are stationary.

18. In a loom, warp-thread-supplying means for delivering warp thread as fast as the weaving progresses, take-up mechanism for moving the fabric away from the weaving region of the loom as the fabric is made, means for laying weft thread in the fabric, means to hold the free ends of a selected series of color yarns in proper relation to the aforesaid threads to be woven into the fabric, a source of general supply of yarns from which to make selections for different patterns, pattern selective mechanism for selecting said color yarns from said supply of color yarns, and mechanism for coiling each color yarn of said series about certain of the aforesaid threads in the form of an oriental knot, while said color yarns are so held at their free ends and still intact from said source, and while the warp threads are stationary.

19. In a loom, warp-thread-supplying means for delivering warp thread as fast as the weaving progresses, take-up mechanism for moving the fabric away from the weaving region of the loom as the fabric is made, means for laying weft thread in the fabric, means to hold the free ends of a selected series of color yarns in proper relation to the aforesaid threads to be woven into the fabric, a source of general supply of yarns from which to make selections for different patterns, pattern selective mechanism for selecting said color yarns from said supply of color yarns, and knot-forming mechanism for knotting said series of color yarns to certain of said threads and severing mechanism for severing the knotted yarns while the latter are stationary at the fell after the completion of the knots.

20. In a loom, warp-thread-supplying means for delivering warp thread as fast as the weaving progresses, take-up mechanism for moving the fabric away from the weaving region of the loom as the fabric is made, means for laying weft thread in the fabric, means to hold the free ends of a selected series of color yarns in proper relation to the aforesaid threads to be woven into the fabric, a source of general supply of yarns from which to make selections for different patterns, pattern selective mechanism for selecting said color yarns from said supply of color yarns, and knot-forming mechanism for knotting said series of color yarns to certain of said threads while said color yarns are so held at their free ends and still intact from said source, and coöperating means permitting all the weaving movements to take place while the warp threads are held immovable.

21. In a loom, warp-thread-supplying means for delivering warp thread as fast as the weaving progresses, take-up mechanism for moving the fabric away from the weaving region of the loom as the fabric is made, means for laying weft thread in the fabric, means to hold the free ends of a selected series of color yarns in proper relation to the aforesaid threads to be woven into the fabric, a source of general supply of yarns from which to make selections for different patterns, pattern selective mechanism for selecting said color yarns from said supply of color yarns, knot-forming mechanism for knotting said series of color yarns to certain of said threads while said threads are maintained stationary, and severing mechanism to sever said color yarns after the knotting and binding operations and after each transverse series thereof is woven into the fabric and prior to the weaving into the fabric of another series thereof.

22. In a loom, means to support ground warp threads, means to support a color yarn with its free end in position to be engaged for weaving, and weaving mechanism, including automatic power operated means to engage the free end of said yarn, for accomplishing the entire interweaving operation of said color yarn with said warp threads with a single unidirectional movement and while the color yarn is continuously so held by said engaging means.

23. In a loom, means to support ground warp threads, means to support a color yarn with its free end in position to be engaged for weaving, and weaving mechanism, including automatic power operated means to engage the free end of said yarn, for interweaving it with said warp threads, and means to lay a binder filling in position to bind said yarn end when woven and while still retained by said engaging means.

24. In a loom, means to support ground warp threads, means to support a color yarn with its free end in position to be engaged for weaving, a hook movable lengthwise of and between said threads to engage said yarn and locking means coöperating with said hook to hold said free end locked until after the completion of the interweaving of said color yarn.

25. In a loom, means to support ground warp threads, means to support a color yarn with its free end in position to be engaged for weaving, a hook movable lengthwise of and between said threads to engage said yarn, means for rocking said hook to bring the open part of the hook into position to engage the yarn and means for thereafter moving said hook and yarn to the fell for aiding in positioning the woven yarn.

26. In a loom, means to support ground warp threads, means to support a series of color yarns with their free ends in position to be engaged for weaving, and weaving mechanism, including a series of hooks movable lengthwise of said warp threads to engage the free ends of said series of yarns, means coöperating with said hooks in moving the woven yarns to the fell, and severing means for thereafter severing said yarns.

27. In a loom, means to support ground warp threads, means to support a series of color yarns with their free ends in position to be engaged for weaving, and weaving mechanism, including a series of hooks movable lengthwise of said warp threads to engage the free ends of said series of yarns, and coöperating mechanism for knotting said yarns back of said hooks about said threads in oriental knots while said free ends are still held by said hooks.

28. In a loom, a hook for engaging a strand of yarn, and automatic locking means provided with yarn-engaging devices to press said yarn against the hook.

29. In a loom, a hook for engaging a strand of yarn, and automatic locking means provided with clamping fingers to straddle the hook and clamp the yarn against the hook.

30. In a loom, means supplying ground warp threads in pairs, means to support a series of color yarns in position for weaving, and weaving mechanism, including a series of hooks movable lengthwise of said warp threads to engage said yarns, and coöperating warp-holding means and hook-operating means for passing a hook and its yarn in a general direction lengthwise of the warp threads from one side of the web to the other side thereof and out to the first side again, said hook in going from one side passing transversely between a pair of warp threads so that it is next to their contiguous or inner sides, and in going from the other side passing each of said two warp threads on its diametrically opposite side.

31. In a loom, knot-forming mechanism, including a knot positioner to move the knot to the fell, said knot positioner also constituting a shear blade, and a second shear blade to coöperate therewith to sever the ends of the knots when at the fell.

32. In a loom, means to support the warp threads at their opposite ends, means to deliver a series of color yarns, knot-forming mechanism to knot said color yarns into the fabric, severing mechanism to sever said yarns after they have been knotted, and a color yarn replacer in the form of a member extending transversely across said yarns and movable transversely thereto to push said yarns back into their original position for further weaving.

33. In a loom, means to support the warp threads at their opposite ends, means to deliver a series of color yarns, knot-forming mechanism to knot said color yarns into the fabric, severing mechanism to sever said yarns after they have been knotted, means to replace the severed ends of the color yarns in position for further weaving, and a comb for combing said yarns into correct position after they are severed.

34. In a loom, means to support the warp threads at their opposite ends, means to deliver a series of color yarns, knot-forming mechanism to knot said color yarns into the fabric, severing mechanism to sever said yarns after they have been knotted, means to replace the severed ends of the color yarns in position for further weaving, and a brush for brushing said yarns taut after they are severed and replaced.

35. In a loom, means to support the warp threads at their opposite ends, means to deliver a series of color yarns, knot-forming mechanism to knot said color yarns into the fabric, severing mechanism to sever said yarns after they have been knotted, and means for straightening and alining said color yarns after they are severed.

36. In a loom, means to support the warp threads at their opposite ends, means to deliver a series of color yarns, knot-forming mechanism to knot said color yarns into the fabric, severing mechanism to sever said yarns after they have been knotted, and means for straightening and alining said color yarns after they are severed, including means for putting the free ends of said color yarns under uniform tension.

37. In a loom, means to support the warp threads at their opposite ends, means to deliver a series of color yarns, knot-forming mechanism to knot said color yarns into the fabric, severing mechanism to sever said yarns after they have been knotted, and a comb for combing said severed yarns into proper alinement for subsequent weaving.

38. In a loom, means to support the warp threads at their opposite ends, means to deliver a series of color yarns, knot-forming mechanism to knot said color yarns into the fabric, severing mechanism to sever said yarns after they have been knotted, a comb for combing said severed yarns into proper alinement for subsequent weaving, and a replacer for pushing the severed yarns past said comb.

In testimony whereof, I have signed my name to this specification, in the presence of two subscribing witnesses.

THOMAS P. WALSH.

Witnesses:
  M. J. SPALDING,
  EDWARD MAXWELL.

It is hereby certified that in Letters Patent No. 1,071,973, granted September 2, 1913, upon the application of Thomas P. Walsh, of Boston, Massachusetts, for an improvement in "Looms for Weaving Oriental Knotted Fabrics," errors appear in the printed specification requiring correction as follows: Page 9, line 92, for the word "througout" read *throughout;* page 11, line 12, after the word "threads" insert the words *while the latter are stationary;* same page, line 14, strike out the words " while the latter are stationary"; and that the said Letters Patent should be read with these corrections therein that the same may conform to the record of the case in the Patent Office.

Signed and sealed this 21st day of April, A. D., 1914.

[SEAL.]

J. T. NEWTON,

*Acting Commissioner of Patents.*